April 5, 1938. W. M. MOXLEY 2,113,159
BAIL
Filed Sept. 14, 1936
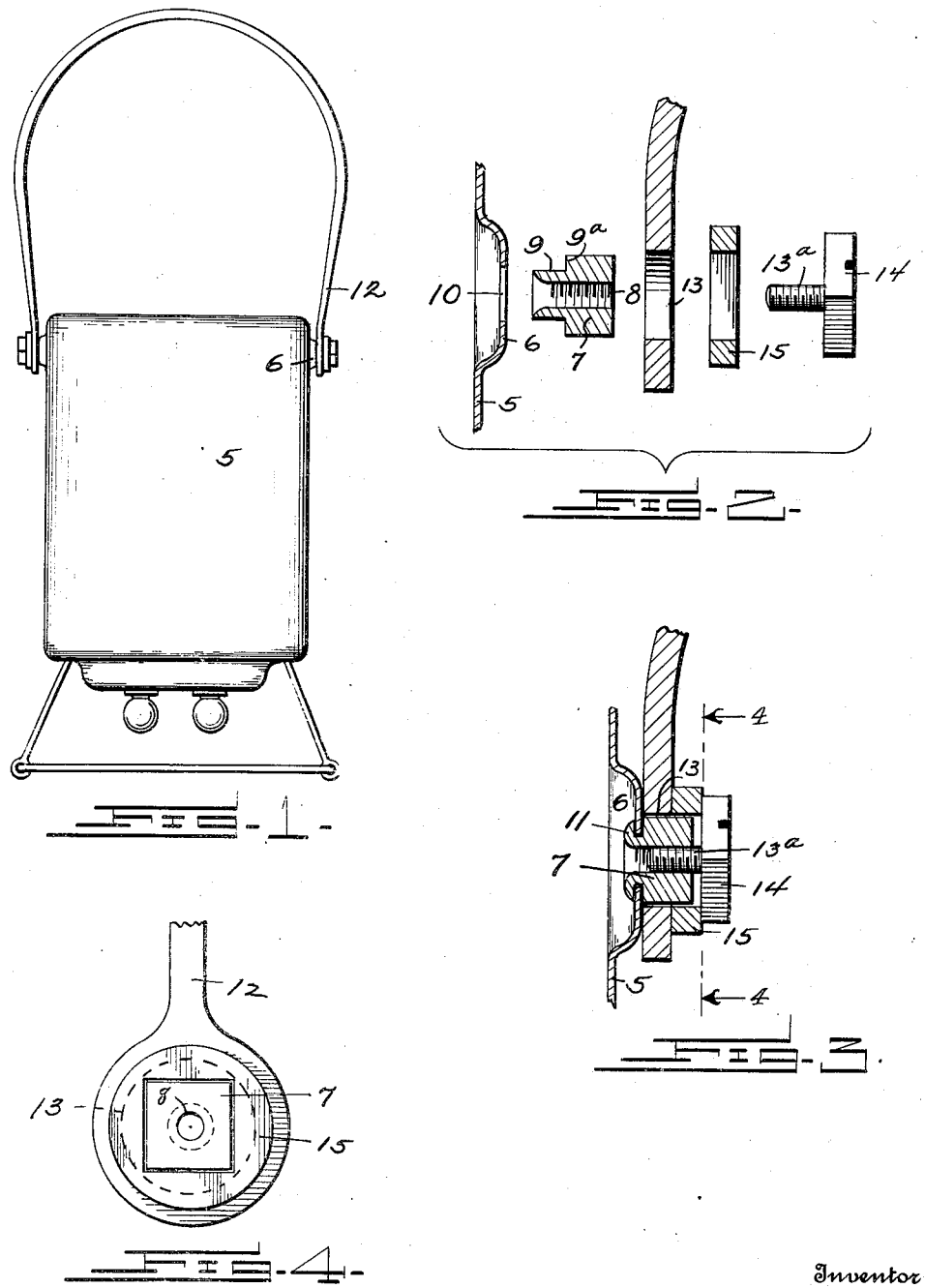
Inventor
William M. Moxley
By Shepherd & Campbell
Attorney Patented Apr. 5, 1938

2,113,159

UNITED STATES PATENT OFFICE 2,113,159

BAIL

William M. Moxley, Kansas City, Mo.

Application September 14, 1936, Serial No. 100,767

3 Claims. (Cl. 220—91)

This invention relates to bails and means for swingingly mounting the same with respect to a body to be supported. The invention is intended for use in connection with electric lanterns but its utility is not limited to that field since it may be employed in connection with any object intended to be supported from a swinging handle or bail, such as oil lanterns, pails, etc.

The primary object of the invention is to provide strong and durable means for pivotally mounting the bail with respect to the lantern body and for frictionally binding said bail to just the desired extent and in such manner that subsequent swinging movement of the bail will neither loosen nor tighten the friction adjusting means.

In the accompanying drawing,

Figure 1 is a front view of a lantern having the invention applied thereto;

Fig. 2 is a disassembled sectional view illustrating the elements of the bail mounting in sparate relation;

Fig. 3 is a sectional view with the parts in assembled relation, and

Fig. 4 is a view with the screw removed and looking toward the outer ends of the washer hereinafter described, as indicated in line 4—4 of Fig. 3.

In the drawing, 5 designates the metallic body of the lantern which is provided upon each of its sides with an outwardly projecting oval boss 6. A spindle 7, square in cross section and having a threaded opening 8 formed therethrough, is provided with the reduced end 9. This reduced end is passed through the central opening 10 of the boss and is then spun over, as indicated at 11, to lock the spindle against subsequent endwise movement out of the boss and also to lock the spindle against turning in the boss. The bail 12 is provided near its ends with circular openings 13, shaped to fit over the spindles to turn with respect thereto.

A screw 13ª is screwed into the threaded opening 8, said screw being provided with an enlarged head 14 which thrusts a washer 15 toward the bail and results in binding the bail with the desired degree of tension, between washer 15 and the outer face of the boss. This washer has an angular central opening which conforms to the shape of the spindle and consequently it is held against turning. In this connection it should be observed that the bowing of the sheet metal of the body 5 to form the boss 6 renders the face of this boss slightly springy or resilient, and this is of advantage in a frictionally bound device of this nature. It should be understood that it would be within the purview of the invention to put another washer like 15 between the bail and the boss if desired.

From the foregoing description, it will be seen that the swinging movement of the bail does not tend to turn the screw 13ª in either direction, because the contact of the bail is not with the screw but is with washer 15, and this washer cannot turn, as previously explained. Consequently, there is no tendency for the screw to be either loosened or tightened by the turning movement of the bail as is so frequently the case in frictionally held devices. After the screw has once been set, the same degree of tension will be maintained until the setting of the screw is designedly changed by the operator.

It is to be understood that the invention is not limited to the precise construction set forth, but that it includes within its purview whatever changes fairly come within either the terms or the spirit of the appended claims.

Having described my invention, what I claim is:

1. The combination with a lantern body having a protuberant boss provided with a central opening, of a spindle angular in cross section and having a reduced end passed through the opening of said boss and turned over inside of said boss to mount the spindle non-rotatably with respect to the boss, a bail having a circular opening shaped to fit upon the spindle, a washer having an angular opening shaped to fit upon the face of the spindle, and a screw having threaded engagement with the spindle and having a head of such size as to project beyond said spindle and engage said washer.

2. A structure as recited in claim 1, wherein said spindle is provided with a central opening with which said screw engages.

3. The combination with a lantern body having an outwardly bowed sheet metal boss integral therewith, of a spindle supported from said body and non-rotatively mounted with respect to said boss, said spindle having angular side faces, a bail having an opening large enough to adapt it to turn upon said spindle despite the angular configuration of the latter, a binding screw engaged with said spindle, and a member disposed between the bail and said screw having an internal opening formed therethrough shaped to fit upon the external face of the spindle and to be held against turning by reason of the angular configuration of the latter.

WILLIAM M. MOXLEY.